United States Patent
Hoffmann et al.

(10) Patent No.: US 8,061,188 B2
(45) Date of Patent: Nov. 22, 2011

(54) METHOD FOR DETERMINING A FUNCTIONAL STATE OF A PIEZOELECTRIC INJECTOR OF AN INTERNAL COMBUSTION ENGINE

(75) Inventors: Robert Hoffmann, Ruhstorf/Rott (DE); Hartmut Wolpert, Zeitlarn (DE)

(73) Assignee: Continental Automotive GmbH, Hannover (DE)

( * ) Notice: Subject to any disclaimer, the term of this patent is extended or adjusted under 35 U.S.C. 154(b) by 296 days.

(21) Appl. No.: 12/375,748

(22) PCT Filed: Jul. 23, 2007

(86) PCT No.: PCT/EP2007/057573
§ 371 (c)(1),
(2), (4) Date: Jan. 30, 2009

(87) PCT Pub. No.: WO2008/015122
PCT Pub. Date: Feb. 7, 2008

(65) Prior Publication Data
US 2009/0309455 A1    Dec. 17, 2009

(30) Foreign Application Priority Data
Aug. 4, 2006    (DE) .................. 10 2006 036 567

(51) Int. Cl.
*G01M 15/04*    (2006.01)
(52) U.S. Cl. ..................................... 73/114.45
(58) Field of Classification Search ............... 73/114.45, 73/114.49
See application file for complete search history.

(56) References Cited

U.S. PATENT DOCUMENTS

| 7,467,543 B2 | 12/2008 | Schoor et al. .............. 73/114.45 |
| 2002/0000218 A1* | 1/2002 | Rueger et al. .................. 123/498 |
| 2007/0001545 A1 | 1/2007 | Schoor et al. .................. 310/317 |

FOREIGN PATENT DOCUMENTS

| DE | 100 12 607 A1 | 9/2001 |
| DE | 103 23 491 A1 | 12/2004 |
| DE | 103 36 639 A1 | 3/2005 |
| EP | 1 138 907 A1 | 10/2001 |
| WO | WO 2005/045234 A1 | 5/2005 |

* cited by examiner

*Primary Examiner* — Eric S McCall
(74) *Attorney, Agent, or Firm* — King & Spalding L.L.P.

(57) ABSTRACT

A check is made to determine whether the capacitance value measured at a specific point in time corresponds to a capacitance value of a calculated further capacitance profile or the measured capacitance value is within two tolerance ranges.

10 Claims, 3 Drawing Sheets

METHOD FOR DETERMINING A FUNCTIONAL STATE OF A PIEZOELECTRIC INJECTOR OF AN INTERNAL COMBUSTION ENGINE

CROSS-REFERENCE TO RELATED APPLICATIONS

This application is a U.S. National Stage Application of International Application No. PCT/EP2007/057573 filed Jul. 23, 2007, which designates the United States of America, and claims priority to German Application No. 10 2006 036 567.4 filed Aug. 4, 2006, the contents of which are hereby incorporated by reference in their entirety.

TECHNICAL FIELD

The invention relates to a method for determining the functional state of a piezoelectric injector of an internal combustion engine.

BACKGROUND

Fuel injection devices for operating an internal combustion engine have been generally known for many years. In what is termed a common-rail injection system the fuel is delivered into the respective combustion chamber of the internal combustion engine by means of injectors, in particular by means of piezoelectric injectors. In this case a high injection pressure is advantageous, since by this means it is possible to achieve a high specific performance of the internal combustion engine on the one hand and low pollutant emissions on the other. When a high-pressure pump and a pressure accumulator are used for the fuel, injection pressures of 1600 to 1800 bar can be attained.

Metering of the fuel quantity by means of a piezoelectric injector is effected by varying the opening and closing times of its nozzle needle. It is well known that the electrical and mechanical characteristic variables which control said nozzle needle are subject to a considerable fluctuation in terms of temperature and/or aging. A precise control of the nozzle needle is advantageous because by that means a more accurate fuel injection is made possible. Furthermore, the very act of applying energy to the piezoelectric injector also leads to an influencing of the electrical characteristic variables. In order, therefore, to maintain the quality of the combustion at all times it is necessary to compensate for the above-cited effects on the fuel injection by means of a control loop.

A method for performing a functional diagnosis of a piezoelectric injector and regulating the fuel injection into an internal combustion engine is known from DE 103 36 639 A1. In this case the piezoelectric injector can be controlled in a charge- or voltage-based manner. It is charged up by applying a specified electrical voltage, and the amount of charge resulting at said voltage is compared with a reference charge amount that is to be expected at said voltage. The functional capability of the piezoelectric injector and/or the power output stage is deduced from the difference between the charge amounts.

SUMMARY

According to various embodiments, a more accurate method for determining the functional state of the piezoelectric injector can be provided.

According to an embodiment, a method for determining the functional state of a piezoelectric injector of an internal combustion engine, wherein the input variables of a control loop for fuel injection are voltage and charge, may comprise the steps of:—calculating the further capacitance profile for the measured piezoelectric injector with the aid of a mathematical approximation method on the basis of a new capacitance and the most recently stored capacitance values, and—detecting an impending failure of the piezoelectric injector by the fact that a measured capacitance value lies outside a first upper and lower tolerance range around the calculated capacitance profile.

According to a further embodiment, an averaged capacitance value for all the piezoelectric injectors can be calculated and a normalizing factor can be determined based on specified average capacitance values and the measured capacitance value can be multiplied by the normalizing factor. According to a further embodiment, the piezoelectric injector may be immediately de-energized if the measured capacitance value lies outside a second upper and lower threshold range around the calculated capacitance profile, wherein the threshold range also includes the tolerance range. According to a further embodiment, when operation of the internal combustion engine is stopped, at least one electrical pulse may be transmitted for the purpose of measuring the capacitance of the piezoelectric injector. According to a further embodiment, a check may be carried out to determine whether the measured capacitance value corresponds to a capacitance value stored in an engine characteristic map and/or lies within a tolerance range around the stored capacitance value.

BRIEF DESCRIPTION OF THE DRAWINGS

Specifics of the invention are explained in more detail with reference to the drawings, in which.

DETAILED DESCRIPTION

Figure 1:
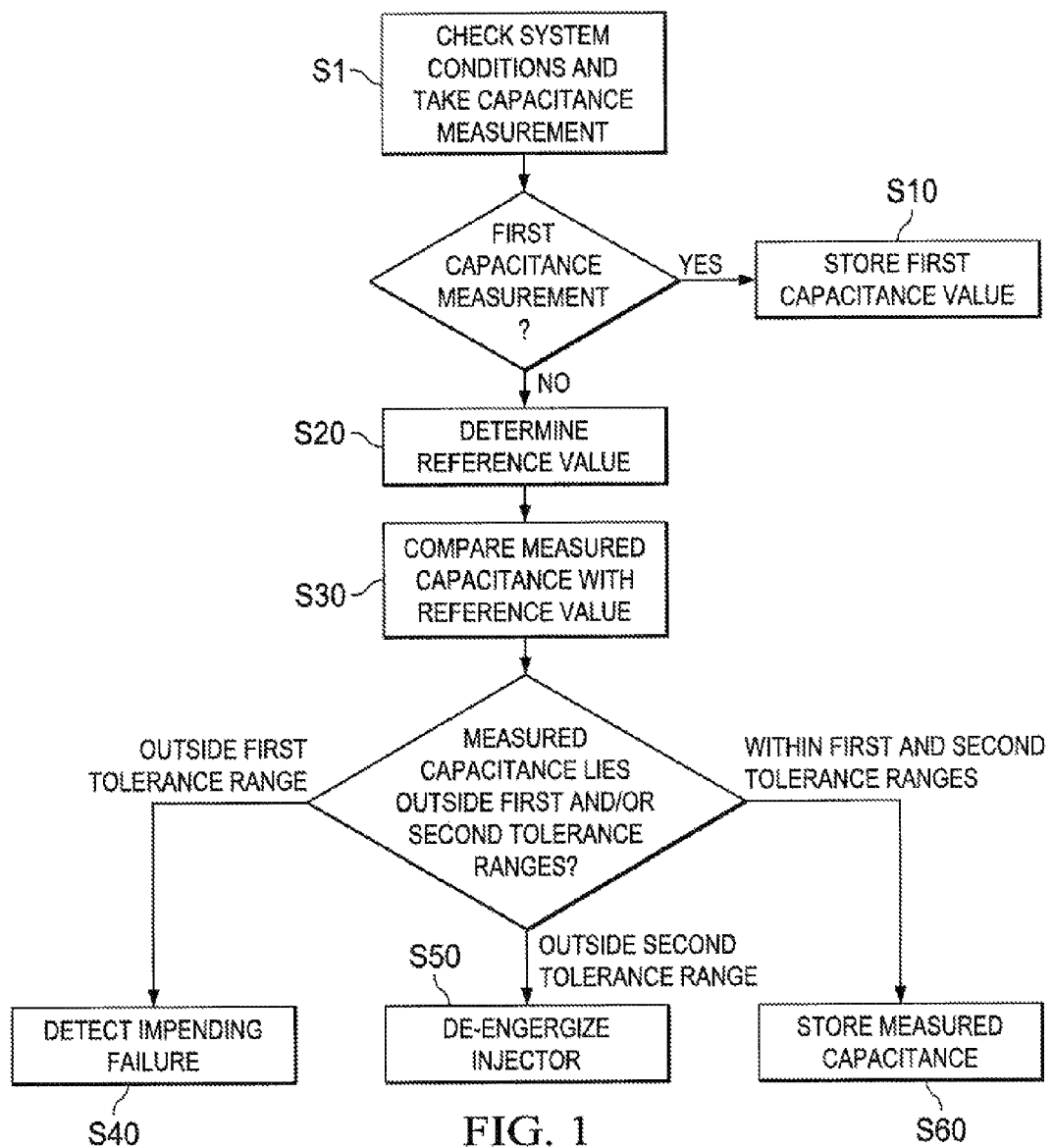
FIG. 1: is a flowchart for a method according to an embodiment for checking for an impending failure of a piezoelectric injector.

According to various embodiments, the functional state of the piezoelectric injector is deduced by means of a comparative consideration of a measured and a calculated capacitance value.

A constant calculation of capacitance values from measured charge and voltage takes place in the system. Said calculated capacitance values are available to different controllers as input variables. The energy required for controlling the piezoelectric injector is also calculated in addition to the capacitance.

According to various embodiments, the new capacitance of the piezoelectric injector is first stored in the control device at the time of initial startup. In addition, at least one further capacitance value is stored under specific ambient conditions. A functional diagnosis observes a multiplicity of ambient conditions (e.g. fuel pressure) and assesses when a capacitance value can be drawn upon for the aging diagnosis. In this case such ambient conditions are chosen which regularly occur during operation and at the same time have low dynamics. This means, for example, that the capacitance values are not stored at points in time at which the fuel pressure exhibits high transients. This is intended to ensure that only capacitance values suitable for long-term comparison are stored.

By determining the first capacitance points it is possible to deduce the effect of aging processes on the change in capacitance. A functional equation via which the further capacitance profile becomes calculable can be set up with the aid of a mathematical approximation method on the basis of the new capacitance and the most recently stored capacitance values. Suitable approximation methods in this case are all mathematical methods which enable a functional equation to be determined from measured values. The functional equation can in this case be formed exponentially or logarithmically e.g. as a straight line or polynomial.

The measured capacitance values are thereupon compared in a first step with the capacitance values calculated from the functional equation and in addition a check is made to determine whether the measured capacitance values fall within a defined tolerance range. Said defined tolerance range also includes the values of the functional equation and is delimited by an upper and lower limit range. The measured capacitance value is stored and used for the further calculation of the capacitance profile. Starting from a specific number of stored capacitance values, whose number is dependent on the size of the memory, a stored capacitance value, e.g. the oldest measured capacitance value, will be overwritten by the currently measured value.

In this case the tolerance range of the upper and lower limit ranges is based on empirical data and measurements of the piezoelectric stack manufacturer and from locally acquired experiences relating to the level of the piezoelectric injector's capacitance fluctuations. Should the measured capacitance profile lie outside said tolerance range, this can be seen as an indication of an imminent failure of the piezoelectric injector, and further measures can be initiated by the system.

At a second step an additional check is carried to determine whether the measured capacitance value is situated within an upper and lower threshold. Said upper and lower thresholds are likewise based on the piezoelectric stack manufacturer's empirical data and constitute the absolute limit values for the capacitance values. In the event that the measured capacitance value lies outside said threshold ranges, the piezoelectric injector is immediately de-energized. The capacitance can be checked at any time by means of the second step and requires no special ambient conditions.

An embodiment is produced on account of the fact that an averaged capacitance value is determined across all of the injectors. Said value is compared with an average capacitance value specified by the piezoelectric stack manufacturer and a normalizing factor is derived therefrom. The currently measured capacitance value is multiplied by said normalizing factor and the product is compared with the calculated capacitance value and/or the aforementioned tolerance ranges and/or thresholds.

An advantageous aspect of this method is that it is assumed that all of the piezoelectric injectors have the same aging method. This means that an injector which has exceeded its own tolerance range, but is still operating perfectly, can lie within the tolerance range of the averaged capacitance values.

A further embodiment consists in at least one pulse signal being transmitted for the purpose of measuring the piezoelectric injector capacitance whenever the operation of the internal combustion engine is stopped and/or started. At said point in time the fuel pressure is very low, as a result of which an injection of fuel into the combustion chamber, on account of the electrical control by means of the pulse signal, does not take place. Low fuel pressure is advantageous to the extent that this enables a more accurate measurement of the capacitance. The accuracy of the capacitance measurement is dependent on the force effect of the fuel as a result of the fuel pressure acting on the piezoelectric injector. The force effect on the piezoelectric injector is all the lower, the lower the fuel pressure.

A further embodiment consists in the fact that further methods are resorted to which can check whether the measured value currently measured corresponds to the calculated value of the functional equation and/or is situated within a tolerance range or within the threshold range. The gradient check method and a monitoring of the variance of the measured values should be cited here in particular. With the gradient check method, a check is made to determine whether the variation of the measured values over time lies within a tolerance range.

A further embodiment is produced as a result of the fact that the measured capacitance value is compared, not with a calculated capacitance value, but with a value stored in an engine characteristic map. In addition a check is made to determine whether the measured capacitance value lies within a tolerance range and/or an upper and lower threshold around the stored capacitance value. This method is advantageous if no computing capacity of the control unit can be made available for calculating the capacitance values, but at the same time memory space is still available.

FIG. 1 shows the method for checking for an impending failure of a piezoelectric injector with reference to a flowchart.

At the first step S1, a check is made to determine whether favorable system conditions are present in relation to e.g. fuel pressure in order to perform a capacitance measurement. If this is the case, a capacitance measurement is carried out. In the event that this capacitance value is the first determined for the piezoelectric injector, said value is stored at step S10.

The capacitance value to be compared with the measured capacitance value is calculated at step S20. This calculation is based on the functional equation that was determined with the aid of a mathematical approximation method on the basis of the new capacitance and at least one measured value. At step S30, said calculated capacitance value is compared with the measured capacitance value. Should the measured capacitance value lie outside the first tolerance range, then at the next step S40 a signal will be sent to the control device to indicate that an impending failure of the piezoelectric injector is likely and further measures are to be initiated by the system.

Should the measured capacitance value lie outside the second threshold range, the injector will be de-energized at step S50. If, on the other hand, the capacitance value of the injector is within the two permissible ranges, it will be stored for further calculation of the functional equation at step S60. If a sufficiently large database is present, older values will be deleted.

Figure 2:
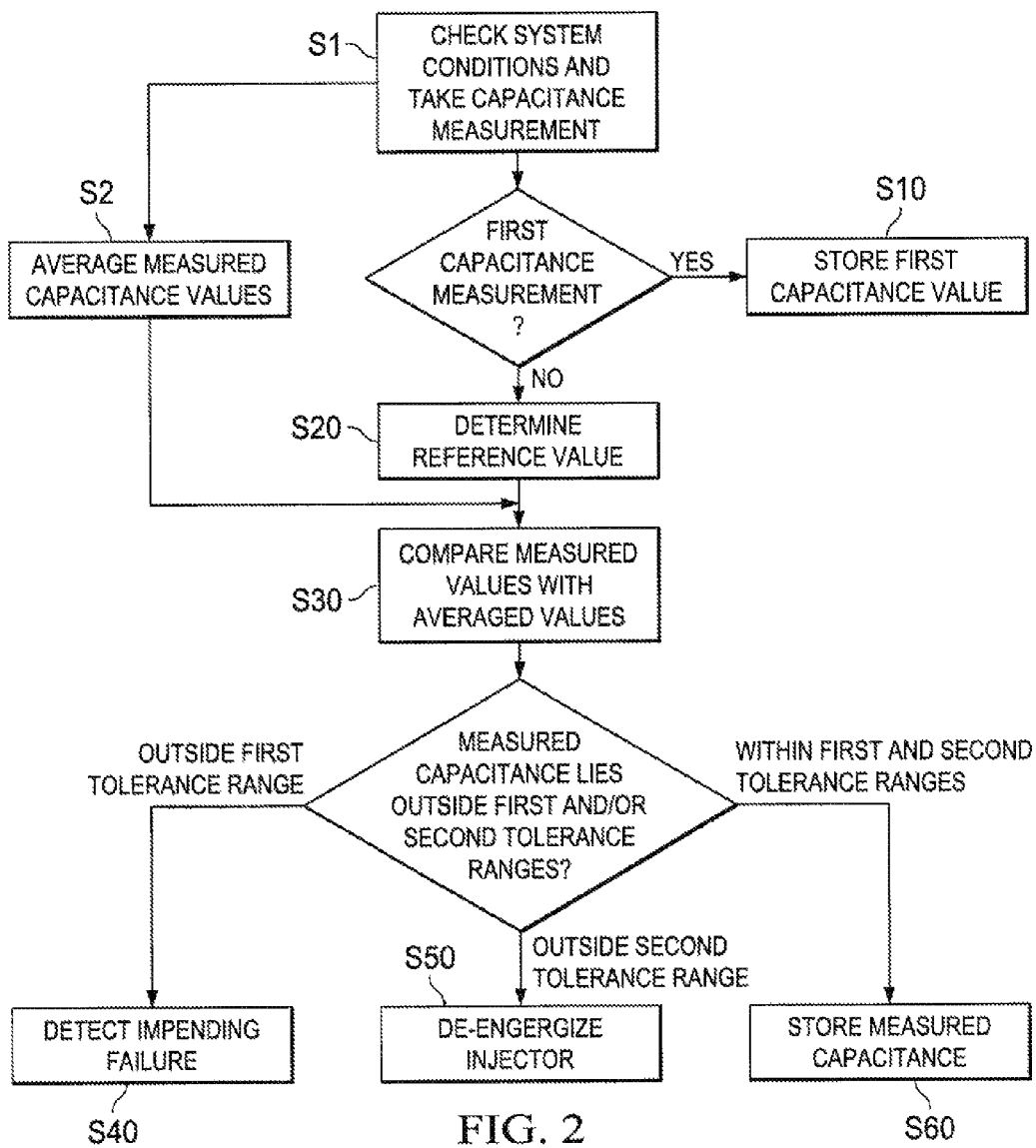
FIG. 2: is a flowchart for a method according to an embodiment for checking for an impending failure of a piezoelectric injector in the case where the measured capacitance is averaged.

FIG. 2 shows the method for checking for an impending failure of a piezoelectric injector with reference to a flowchart, the measured capacitance being averaged in this case.

Steps S1, S10 and S20 correspond to the steps with the same reference signs from FIG. 1. The capacitance values measured at step 1 for all piezoelectric injectors are averaged at step S2. A normalizing factor can be calculated based on said averaged capacitance value and an averaged capacitance value specified by the manufacturer. Said normalizing factor is multiplied by the measured capacitance value. At step 30, the capacitance values calculated at step 20 are therefore compared with the capacitance value calculated at step S2. Steps S40, S50 and S60 again correspond to the steps from FIG. 1.

Figure 3:
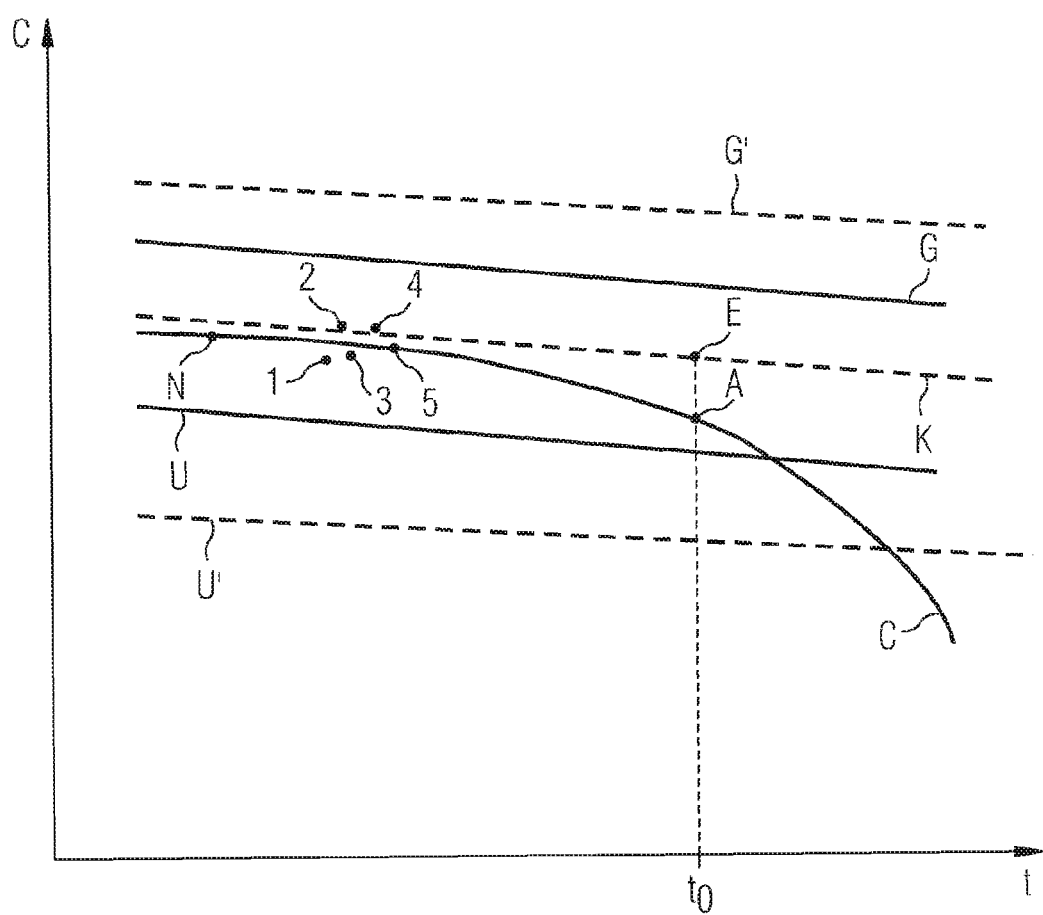
FIG. 3: shows the variation over time of the capacitance profile of a piezoelectric injector under ambient conditions that are the same in each case.

FIG. 3 shows a graph plotting the variation with time of the capacitance profile under the same ambient conditions as a result of aging effects.

The capacitance profile measured over time is represented by the characteristic curve C. The dashed characteristic line K corresponds to the calculated capacitance profile. It is the result produced from the mathematical approximation of the measured new capacitance N and the (in this case) first five capacitance measured values 1 to 5. In this case the measuring point curve has been approximated with the aid of a straight line.

The shape of the calculated capacitance characteristic line K is situated within a first tolerance range which is bounded by an upper limit range G and a lower limit range U. Said tolerance range is in turn situated within a second threshold range which is described by means of an upper limit range G' and a lower limit range U'.

Point A on the characteristic curve C stands for a capacitance value measured at time t0. Said point A is compared with the point E of the characteristic line K calculated with the aid of the functional equation at the same time t0.

There is no fear of impending failure of the piezoelectric injector if the measuring point A of the measured capacitance curve C either is situated within the tolerance range which is delimited by the upper limit range G and the lower limit range U or corresponds to the calculated capacitance value E from the functional equation.

For the case not shown in the drawing, namely that the measuring point A is situated within the threshold range which is delimited by the upper limit range G' and lower limit range U', an impending failure of the injector is likely. If the measuring point A is situated outside the threshold range bounded by the upper limit range G' and the lower limit range U', the injector is de-energized.

What is claimed is:

1. A method for determining the functional state of a piezoelectric injector of an internal combustion engine, wherein the input variables of a control loop for fuel injection are voltage and charge, the method comprising the steps of:
    measuring a plurality of capacitance values for the piezoelectric injector over time, each capacitance value measured during ambient conditions of the internal combustion engine,
    calculating a capacitance profile or functional equation for the piezoelectric injector with the aid of a mathematical approximation method based on the plurality of capacitance value measurements over time, the capacitance profile or functional equation representing an approximation of the long-term change in capacitance of the piezoelectric injector due to aging of the piezoelectric injector,
    measuring a current capacitance value for the piezoelectric injector,
    determining a reference capacitance value based on the capacitance profile or functional equation representing the long-term change in capacitance due to aging of the piezoelectric injector, and
    detecting an impending failure of the piezoelectric injector if the measured capacitance value lies outside a first upper and lower tolerance range around the reference capacitance profile.

2. The method according to claim 1, wherein an averaged capacitance value for all the piezoelectric injectors is calculated and a normalizing factor is determined based on specified average capacitance values and the measured capacitance value is multiplied by the normalizing factor.

3. The method according to claim 1, wherein the piezoelectric injector is immediately de-energized if the measured capacitance value lies outside a second upper and lower threshold range around the reference capacitance profile, wherein the threshold range also includes the tolerance range.

4. The method according to claim 1, wherein when operation of the internal combustion engine is stopped, at least one electrical pulse is transmitted for the purpose of measuring the capacitance of the piezoelectric injector.

5. The method according to claim 1, wherein a check is carried out to determine whether the measured capacitance value at least one of: corresponds to a capacitance value stored in an engine characteristic map and lies within a tolerance range around the stored capacitance value.

6. A system for determining the functional state of a piezoelectric injector of an internal combustion engine, comprising:
    a control loop wherein the input variables of the control loop for fuel injection are voltage and charge,
    means for measuring a plurality of capacitance values for the piezoelectric injector over time, each capacitance value measured during ambient conditions of the internal combustion engine,
    means for calculating a capacitance profile or functional equation for the piezoelectric injector with the aid of a mathematical approximation method based on the plurality of capacitance value measurements over time, the capacitance profile or functional equation representing an approximation of the long-term change in capacitance of the piezoelectric injector due to aging of the piezoelectric injector,
    means for measuring a current capacitance value for the piezoelectric injector,
    means for determining a reference capacitance value based on the capacitance profile or functional equation representing the long-term change in capacitance due to aging of the piezoelectric injector, and
    means for detecting an impending failure of the piezoelectric injector if the measured capacitance value lies outside a first upper and lower tolerance range around the reference capacitance profile.

7. The system according to claim 6, comprising means for calculating an averaged capacitance value for all the piezoelectric injectors and for determining a normalizing factor based on specified average capacitance values and for multiplying the measured capacitance value by the normalizing factor.

8. The system according to claim 6, wherein the piezoelectric injector is operable to be immediately de-energized if the measured capacitance value lies outside a second upper and lower threshold range around the reference capacitance profile, wherein the threshold range also includes the tolerance range.

9. The system according to claim 6, wherein when operation of the internal combustion engine is stopped, at least one electrical pulse is transmitted for the purpose of measuring the capacitance of the piezoelectric injector.

10. The system according to claim 6, wherein the system is operable to determine whether the measured capacitance value at least one of: corresponds to a capacitance value stored in an engine characteristic map and lies within a tolerance range around the stored capacitance value.

* * * * *